United States Patent [19]

Segaud

[11] Patent Number: 5,182,494
[45] Date of Patent: Jan. 26, 1993

[54] MULTIPLEXED CONTROL DEVICES FOR A SET OF ELECTRICAL DEVICES, E.G. IN A MOTOR VEHICLE

[75] Inventor: Daniel Segaud, Paris, France

[73] Assignee: Valeo Vision, France

[21] Appl. No.: 617,700

[22] Filed: Nov. 26, 1990

[30] Foreign Application Priority Data

Nov. 27, 1989 [FR] France ............................ 89 15553

[51] Int. Cl.$^5$ ............................................. B60Q 1/02
[52] U.S. Cl. ........................................ 315/80; 315/77; 315/318; 315/320; 307/10.8
[58] Field of Search ................ 315/80, 82, 77, 315, 315/318, 320; 307/10.8

[56] References Cited

U.S. PATENT DOCUMENTS

| | | | |
|---|---|---|---|
| 3,778,676 | 12/1973 | Keller | 315/318 X |
| 3,881,128 | 4/1975 | Douglas et al. | 307/10.8 X |
| 4,667,129 | 5/1987 | Papillon | 315/82 |
| 4,723,095 | 2/1988 | Suazas et al. | 315/82 |
| 4,727,261 | 2/1988 | Fairchild | 315/82 X |
| 4,890,000 | 12/1989 | Chou | 315/320 X |

FOREIGN PATENT DOCUMENTS

| | | |
|---|---|---|
| 0217762 | 4/1987 | European Pat. Off. . |
| 2809763 | 9/1979 | Fed. Rep. of Germany . |
| 2154209 | 5/1973 | France . |

*Primary Examiner*—Eugene R. LaRoche
*Assistant Examiner*—Do Hyun Too
*Attorney, Agent, or Firm*—Blakely, Sokoloff, Taylor & Zafman

[57] ABSTRACT

A system for controlling a set of electrical devices, e.g. in a motor vehicle, having a decoding module for a group of such devices, the decoding module receiving an electrical signal containing instructions to switch on and to switch off the electrical devices in the group and delivering control signals on the basis of those instructions, and a set of switches controlled by the control signals and each connected between a common electrical power line and a respective electrical device in the group. The controlled switches are mounted in the immediate vicinity of the corresponding electrical devices of the group, and the decoding module is housed in a housing which is separate from the controlled switches.

12 Claims, 3 Drawing Sheets

MULTIPLEXED CONTROL DEVICES FOR A SET OF ELECTRICAL DEVICES, E.G. IN A MOTOR VEHICLE

The present invention relates in general to systems for controlling electrical devices, in particular in motor vehicles, and more particularly to multiplexed control of a plurality of such electrical devices.

Although this specification refers throughout to an application of the invention to the lights of a vehicle, the person skilled in the art will understand that it is equally applicable to multiplexed control of all kinds of electrical devices, such as motors, heater resistance elements, electronic circuits, etc., and these devices need not necessarily be on board a vehicle.

BACKGROUND OF THE INVENTION

It is conventional for a light unit, e.g. a rear light unit for a vehicle, to comprise a plurality of lights (rear light, brake light, indicator light, reversing light, and rear fog light) with the lamps of all the lights being connected to a common ground and with each of them being powered via a respective conductor extending from the power terminal of the lamp to a special switch situated on the dashboard.

Thus, in order to power its various lamps, a five-light unit requires five specific power conductors, each of sufficient section to convey power currents that may typically reach two amps.

A multiplexed control system has recently been developed for a group of lights in which a single power supply line goes to the light unit, and a low current control line conveys signals containing instructions for turning each of the lights on and off. A specialized decoding or demultiplexing electronic circuit serves to recognize the instructions contained in the signals and to control switch means accordingly to switch the lamps in each of the lights on or off selectively. The switch means may be relays, but they are preferably power semiconductors.

In the prior art, the decoding module and the power semiconductors are integrated in a single assembly which may either be incorporated in the light unit, or else may be in the form of a separate unit situated in the vehicle close to said light unit. A considerable drawback of this prior solution lies in the practical impossibility of making a single standard assembly for various different types of vehicle light unit. For example, there is considerable variation between the number of lights in a front or rear light unit and the functions they are to perform between a bottom-of-range vehicle and a top-of-range vehicle.

In addition, the decoding module must be specially designed to be capable of withstanding the severe temperature environment caused by heat being dissipated in the power switches.

SUMMARY OF THE INVENTION

The present invention seeks to mitigate these drawbacks of the prior art, and to this end it provides a system for controlling a set of electrical devices, e.g. in a motor vehicle, the system being of the type comprising a decoding module for a group of such devices, the decoding module receiving an electrical signal containing instructions of a non-preselected sequence to switch on and switch off the electrical devices in the group and delivering control signals on the basis of said instructions, and a set of switches controlled by said control signals and each connected between a common electrical power line and a respective electrical device in the group, wherein the controlled switches are mounted in the immediate vicinity of the corresponding electrical devices of the group, and the decoding module is housed in a housing which is separate from the controlled switches.

Preferably, the controlled switches are mounted on or in link means for said electrical devices.

The invention also provides a link means for a system as defined above, wherein the link means comprises an adapter suitable for co-operating mechanically with a predefined connector for an electrical device controlled by the system, said adapter being fixed to a controlled switch module, the link means serving both to mount the electrical device in the system and to put the controlled switch into circuit.

BRIEF DESCRIPTION OF THE DRAWINGS

Embodiments of the invention are described by way of example with reference to the accompanying drawings, in which.

DETAILED DESCRIPTION

Figure 1:
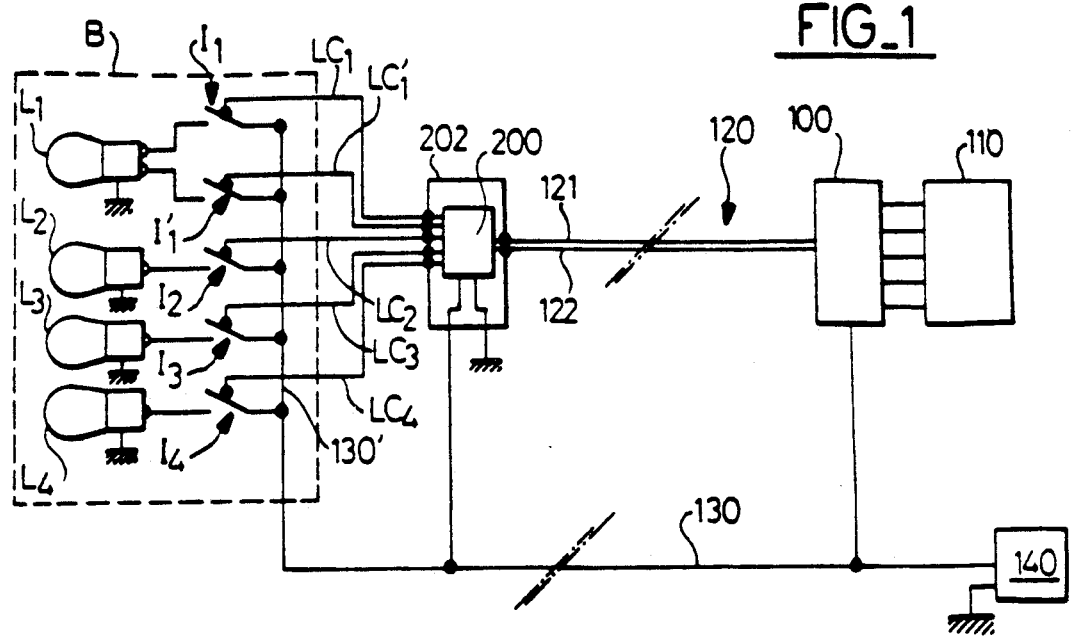
FIG. 1 is a block diagram of a system of the present invention.

With reference initially to FIG. 1, a rear light unit for a motor vehicle is given an overall reference B and comprises four lamps L1, L2, L3, and L4. Lamp L1 is a lamp having two filaments, respectively for the "rear light" function and for the "brake light" function. The lamps L2 to L4 may constitute lamps respectively for an indicator light, a reversing light, and a rear fog light. The optical means (mirrors, colored filters, outer glass, etc.) used for forming the corresponding beams are not described since these means are well known in the art and do not directly constitute a part of the invention.

The lamps are preferably mounted in conventional manner on a common lamp holder (not shown) including cut-out circuits or printed circuits for powering the lamps and means for fixing the lamps in sockets in their appropriate positions, with the ground terminal of each lamp being permanently connected to a common ground.

An encoding or multiplexing system 100, situated close to the dashboard of the vehicle, for example, is connected to a set of control switches (not shown individually) provided on said dashboard for the purpose of enabling the user to switch the lights on and off, said set being represented diagrammatically at 110.

Depending on the states of the various controls in the set of switches 110, the encoding module 100 generates a multiplexed electrical signal on a bus 120 constituted by a pair of conductors 121 and 122. The signal is representative of the respective states of said controls and consequently of instructions for switching on and off the various lamps in the light unit.

This bus 120 and a single power line 130 (suitable for conveying +12 volts DC from a battery 140, for example), extend to the vicinity of the light unit B. (It should be observed that if the system is designed to control not only the switching on and off of lamps in a single light unit, but also other electrical systems that are to be remotely controlled, whether by the driver or by other control means, then the bus 120 and the power line 130 are taken to all the points in the vehicle where such electrical systems are to be found.)

The system of the present invention comprises firstly a decoding or demultiplexing module 200 sheltered in a housing 202 which is situated outside the light unit per se, but is preferably in the vicinity thereof. This decoding module may be constituted, for example, in the form of a single specialized integrated circuit powered by the +12 volts present on the line 130, and it includes both an input for receiving the signal generated on the bus by the encoding module 100, and a set of control outputs (five in the present example) having five respective control lines LC1, LC1', LC2, LC3, and LC4 connected thereto for controlling the various lamps in the light unit B.

The light unit B comprises a suitable support (not shown in FIG. 1) with switches disposed in the vicinity of each of the lamps, which switches are preferably in the form of semiconductor power components.

Two first controlled switches I1 and I1' are associated with the two-filament lamp L1, and each single-filament lamp L2 to L4 is associated with a respective signal controlled switch I2 to I4.

Each switch has a current input terminal, a current output terminal, and a control signal input terminal.

The current input terminals of the various controlled switches are connected in common to the power line 130.

The current output terminals are connected to respective positive terminals of the associated lamps (to the two positive terminals for the respective filaments of the lamp L1 in the case of components I1 and I1').

The control signal input terminals of the components I1, I1', I2, I3, and I4 are connected to respective ones of the control line LC1, LC1', LC2, LC3, and LC4.

The power components are preferably mounted (optionally removably, e.g. by being plugged in) on the lamp holder of the light unit, in the vicinity of respective ones of the lamp emplacements.

The system of the present invention operates as follows. When the driver acts on an appropriate control in the set of switches 110 to cause one of the lights in the light unit B to be switched on or off (possibly simultaneously with a corresponding light in a second light unit), then the encoding module 100 detects this action and changes the multiplexed control signal accordingly. The decoding module detects this change immediately and consequently instructs the power component concerned via the associated control line to switch on or off, depending on the driver's instruction, thereby switching on or off the lamp of the corresponding light.

According to an essential feature of the present invention, and as mentioned above, the power switch components are integrated in the connectors for the electrical devices, while the decoding module is sheltered in a housing situated at a distance. When the invention is applied to a light unit, the connectors are constituted by the lamp holder. This configuration of switches close to the devices they control and decoding module situated further away provides several advantages:

the decoding module may be designed identically for a wide range of types of light unit or other sets of electrical devices, thereby making it possible to use a standard module; more precisely, a universal decoding module which is capable of decoding all of the lighting functions that may be implemented in any one of the rear light units in a range thereof, for example, may be used with a wide range of such units form the simplest to the most complex without any significant cost penalty;

by mounting the power components in the connector, the number of power components provided is limited to the number strictly required by the functions the connector is called upon to perform, thereby achieving substantial savings since such components are relatively expensive;

since the decoding module is physically separated from the power components, it is protected from thermal effects (heating and cooling) generated by such components; more generally, the decoding module may be constituted by a relatively fragile microcircuit and may be protected as required by a suitable design of housing 202, with such protection being much more difficult to achieve within the severe environment of the power components;

system installation is facilitated: the decoding module is conventionally small in size (typically a chip having dimensions of about 20 mm×20 mm) and space can easily be found for it either within the connector, on an outside surface thereof, or physically separate therefrom in the vicinity thereof; in addition, the larger power components are advantageously spread out over the connector without greatly increasing its size;

system maintenance is facilitated; thus if a decoding module is defective, it can be replaced either on its own or together with the housing containing it, and there is no need to replace the power components. In this respect, it may be advantageous to provide disconnectable connection means between the housing 202 and the connector such as the lamp holder, and also between the housing 202 and the lines 120 and 130. Similarly, in the event of a power component being faulty, then only the faulty power component needs replacing in the connector. This operation is further facilitated if the power components are mounted in the connector via their own disconnectable connectors, e.g. constituting plug-in units. The power components are then about as easy to replace as the electrical devices they control, e.g. the lamps;

the power components are relatively robust and do not suffer from being in the severe environment to which they are exposed in addition, the connector in which the power components are mounted may advantageously act as a radiator for dumping the heat that they dissipate; obtaining equivalent heat dissipation externally to the connector per se would require special arrangements that are bulky and expensive.

As mentioned above, the present invention makes it possible to use a standard or "universal" decoding module.

However, according to another advantageous feature of the present invention, it is also possible to use power components that are standard or "universal" in association with a specially designed connector, e.g. a specially designed lamp holder.

By way of more specific example, there are three types of lamp in common use in the rear lights of vehicles, namely: 5-watt single-filament lamps, 21-watt single-filament lamps, and 2-filament lamps having a 5-watt filament and a 21-watt filament.

In accordance with the invention, three types of modular subassembly can be provided, each comprising (possibly in association with special redesign of the lamp holder): a socket for a lamp; and emplacements for one or two power components of dimensions appropriate to the current drawn by the filament(s) of the type of lamp that the socket is designed to receive. The subassembly is organized as a module suitable for connection both to a lamp and to a power line (line 130 in FIG. 1), with ground and the associated control line coming from the decoding module.

Figure 2A:
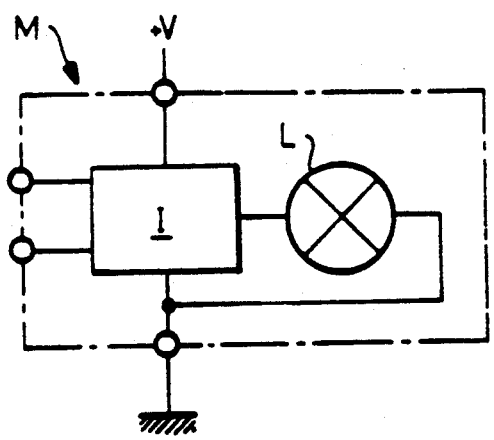
FIGS. 2a and 2b are fragmentary views showing details of the FIG. 1 system.

FIG. 2a is a circuit diagram of one such module M which is suitable for a single-filament lamp L. In practice, two versions of such a module are provided, one version for a 5-watt lamp and another for a 21-watt lamp, with the power component I being dimensioned as a function of the maximum current that may flow through the corresponding lamp.

Figure 2B:
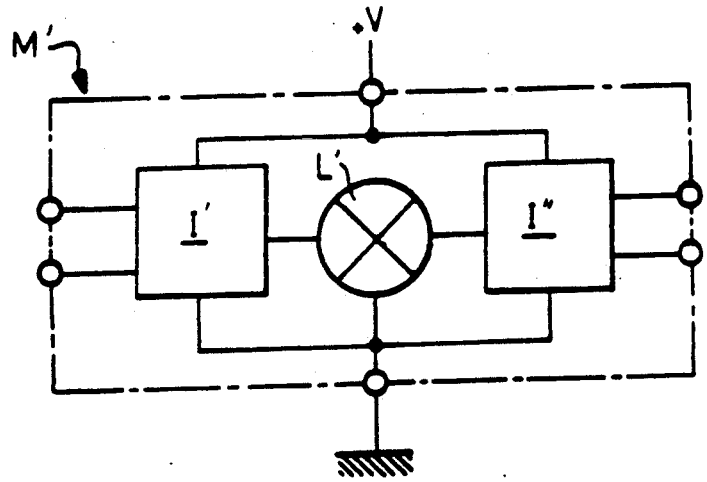

FIG. 2b shows a module M' for a two-filament lamp L' having two power components I' and I" respectively dimensioned for a 5-watt filament and for a 21-watt filament. Each power component has its own input for its own command line from the decoding module.

Thus, when designing a light unit, it is possible to build up any combination of the three above-mentioned basic modules, with only the number and distribution of the modules varying from one light unit to another. In addition, the modules may be very compact and this facilitates designing the body of a light unit for receiving them.

The power components are preferably of the "intelligent" type. In other words, they are capable of responding not only to control signals addressed to them by the decoding module for selectively connecting or disconnecting the lamp to or from the power line, but they also include means for warning the decoding module of possible failures either of the lamps or of the components themselves. Thus, in this preferred design the control line between the decoding module and the component is a two-way line for transmitting information in both directions.

Similarly, fault information received by the decoding module from the intelligent power component is retransmitted to the encoding module which is integrated in the central multiplexed control unit for controlling vehicle functions. The control bus 120 is thus likewise capable of interchanging data in both directions between the decoding module and the central unit, and more generally between a set of decoding modules provided in a vehicle and the said central unit.

Specific embodiments of a lamp holder with associated power switch modules in accordance with the present invention are now described with reference to FIGS. 3 to 10.

Figure 3:
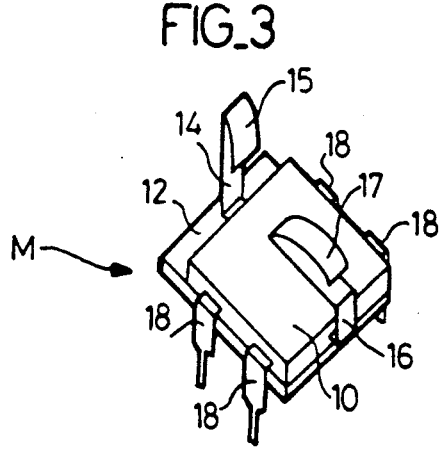
FIG. 3 is a perspective view of a first type of subassembly for a system of the invention.

FIG. 3 shows a first example of a module M for a single lamp and provided in the form of a power integrated circuit.

The circuit is housed in a package 10 fixed on a support plate 12. A ground connector 14 projects upwards from one end of the package and includes a curved and downwardly folded contact portion 15 for coming into contact with the base C of the lamp. A positive voltage connector 16 extends from the other end of the package 10 substantially over the top face thereof and includes a curved rearwardly folded contact portion 17 for making contact with the central power terminal of the lamp.

In addition, four connection pins 18 corresponding to the four terminals visible in FIG. 2a extend downwards in pairs from two opposite sides of the package 10.

Figure 4:
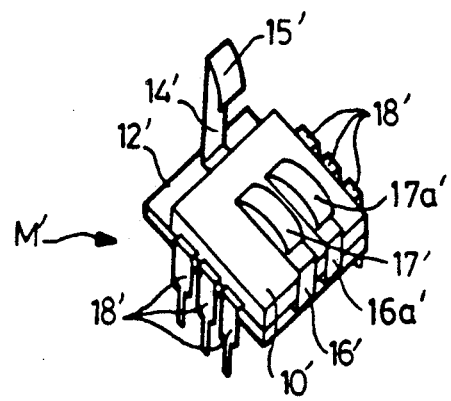
FIG. 4 is a perspective view of a second type of subassembly for a system of the invention.

FIG. 4 shows a practical embodiment of a module M' as shown diagrammatically in FIG. 2b. The references used in FIG. 3 include a "prime" symbol and they designate portions which are identical or similar to portions having the same numerical references in FIG. 3.

Differences compared with the module of FIG. 3 are as follows:

two positive voltage connectors 16' and 16a' are provided side by side, each comprising a curved contact portion 17' or 17a', suitable for making contact with a respective contact terminal on a two-filament lamp;

six connection pins 18' are provided corresponding to the six connection terminals visible in FIG. 2b; and the package 10' contains two power switches.

Advantageously, both types of module M and M' shown in FIGS. 3 and 4 have the same outside dimensions so as to be capable of being received in a single design of housing which is provided both for single-filament lamps and for two-filament lamps.

Figure 5:
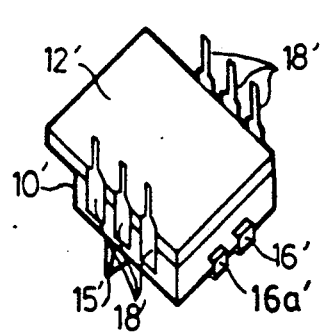
FIG. 5 is a perspective view from a different viewpoint of the FIG. 4 subassembly together with an associated portion of a lamp holder.

FIG. 5 shows the module M' of FIG. 4 upside-down and also the structure of an associated socket 22 formed in a lamp holder 20.

The structure 22 includes a cylindrical passage 24 for receiving the base C of the lamp; and a groove 26 runs along the cylindrical passage 24 to receive the ground conductor 14', 15'.

The passage 24 is terminated by a generally rectangular housing 28 for receiving the module M'. Two side cut-outs 30 in the housing 28 serve to receive the side pins 18', while an end cut-out 32 serves to receive the portion of the support 12' which projects beyond the package 10'. Conventional devices for holding a lamp in the socket (e.g. a bayonet fitting or the like) are not shown.

Figure 6:
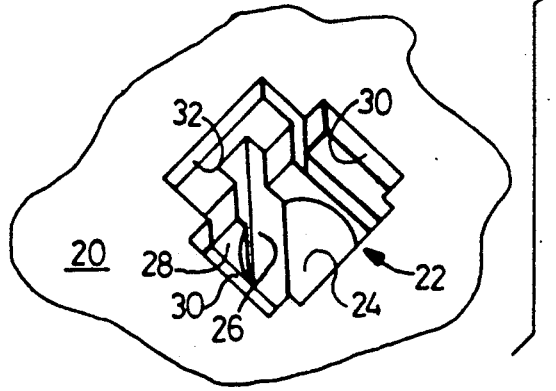
FIG. 6 is a cross-section through the lamp holder and the subassembly of FIG. 5 together with a lamp mounted in the holder.
Figure 6:
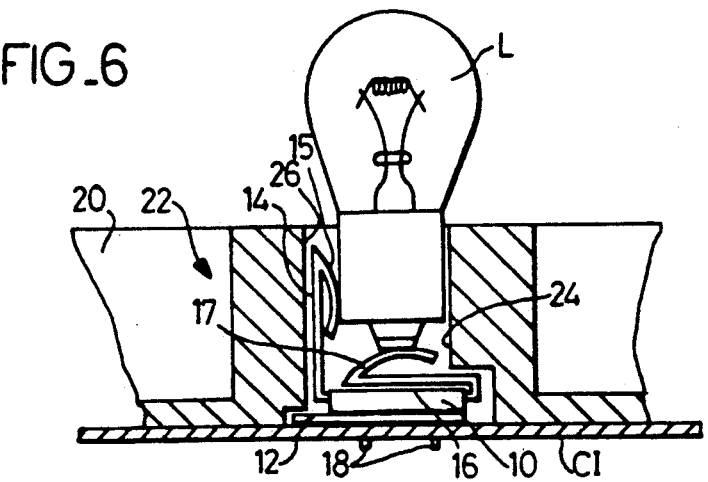

FIG. 6 shows a portion of a lamp holder 20 with the socket 22 being shown in association with a module M together forming a socket for a single-filament lamp L. A printed circuit CI is also shown.

The module M and the lamp L are installed in the lamp holder respectively from the inside and from the outside (from below and from above in FIG. 6), and the printed circuit CI is fixed by any appropriate means to the inside face of the lamp holder.

The printed circuit includes appropriate tracks and holes to connect the various modules to ground, to the positive voltage, and to the decoding module 200. In the example shown, the ends of the pins 18 are inserted into holes and are soldered to the inside face (the bottom face in FIG. 6) of the printed circuit.

FIGS. 7 to 10 show embodiments in which a power switch module M or M' is physically associated with a socket 40 which constitutes an adapter between the base C of a lamp L and a socket holder 20 which serves the same mechanical function as the lamp holder described above except insofar as it receives the lamps indirectly via the sockets.

Figure 7:
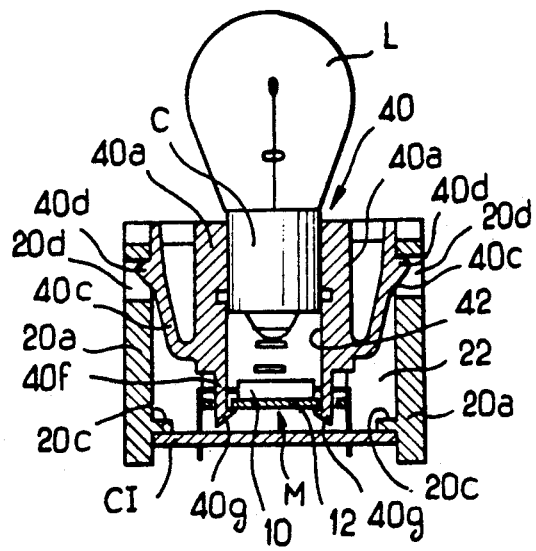
FIG. 7 is a section through a third type of subassembly.
Figure 8:
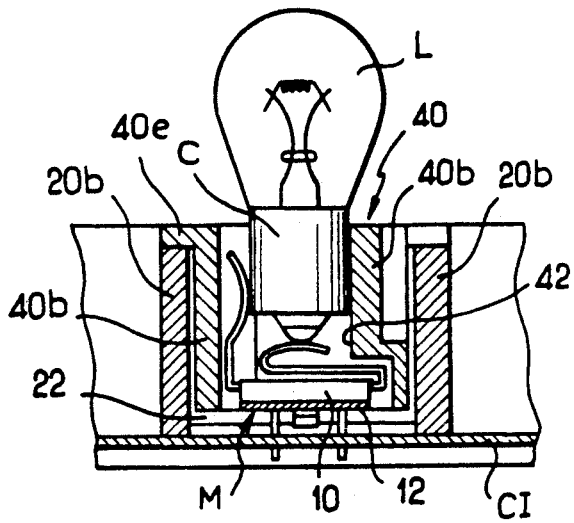
FIG. 8 is a section perpendicular to the section of FIG. 7.

In FIGS. 7 and 8, the socket holder 20 includes a cavity 22 for receiving a socket 40, which cavity is defined by two side walls 20a and two transverse walls 20b. The printed circuit CI is fixed between the two side walls against shoulders 20c. The socket 40 includes a central housing 42 which is essentially cylindrical and which receives the base C of the lamp L, which socket essentially comprises two side walls 40a and two transversal walls 40b. Each side wall has a resiliently deformable tab 40c including an outwardly projecting tooth 40d suitable for engaging in an opening 20d formed in the adjacent side wall 20a of the socket holder 20. In addition, an outwardly projecting shoulder 40e is provided in the end region of the walls of the socket furthest from the printed circuit, which shoulder bears against a top surface of one of the transverse walls 20b of the socket holder, thereby securing the socket appropriately in its housing. The base C of the lamp L is of the bayonet type, and appropriate grooves (not shown) are provided in the inside faces of the walls of the socket for removably fixing the lamp.

The power switch module M is essentially of the same design as that described above with reference to FIG. 3. It is fixed in the bottom region of the socket 40 by means of flexible tabs 40f projecting from the printed circuit ends of the walls of the socket, said tabs 40f passing through openings formed in the support plate 12 of the module and including catches 40g for snap-fastening behind said plate.

It will be understood that the assembly constituted by the socket 40 and the module M is capable of constituting a standard part.

Further, it should be observed in accordance with an essential feature of the invention that the power switch integrated in the module M co-operates with an adapter constituted in this case by the socket 40 in such a manner as to provide simultaneously both mechanical assembly and electrical interconnection of an electrical device which is to be powered selectively (in this case the lamp) and an item conveying various electrical signals (in this case the socket holder provided with its printed circuit).

Figure 9:
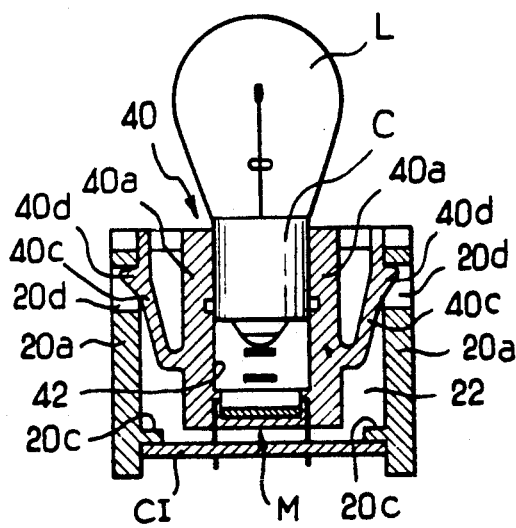
FIG. 9 is a section through a fourth type of subassembly.
Figure 10:
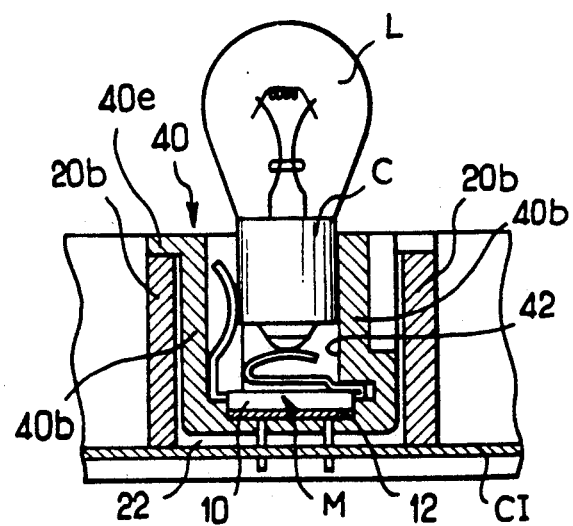
FIG. 10 is a section perpendicular to the section of FIG. 9.

The variant embodiment shown in FIGS. 9 and 10 differs from that of FIGS. 7 and 8 in that the power switch module M is fixed to the socket 40 by virtue of the socket being molded over the module. It can thus be seen that the module is tightly imprisoned at the bottom of the socket so that here again these two items together constitute a single standard part.

In yet another variant (not shown) the package 10 and the socket may be formed integrally, preferably by molding a plastic material. In this case, the socket itself constitutes the package in which the semiconductor circuit including the controlled switch is encapsulated.

Clearly the embodiments of FIGS. 7 to 10 may be varied in numerous ways. In particular, the person skilled in the art will be capable of making the modifications necessary for applying the concepts demonstrated by these embodiments to controlling electrical devices other than lamps, and in particular to controlling motors, and will also be capable of defining items capable of becoming standard replaceable items and serving simultaneously to provide both mechanical assembly on a standard connector for the electrical device (equivalent to the base of a lamp), and electrical connections to the semiconductor switch.

Naturally, the present invention is not limited to the embodiment described above and shown in the drawings, and the person skilled in the art will be able to make any variant or modification within the scope of the invention.

Thus, the invention may be used for signalling lights or for beam-forming headlights, or for combinations of signalling lights and headlights.

In addition, in rear light units, a single decoding module may serve not only to control the various lamps in the light module, but also to control other electrically-controlled functions at the rear of a vehicle, in particular locking and unlocking the rear boot or door, lighting the boot, lighting the number plate, etc.

In addition, as mentioned above, the system of the invention may be used for multiplexed control of any kind of electrical device in a vehicle or elsewhere.

I claim:

1. A system for controlling a set of electrical devices in a motor vehicle, the system being of the type comprising a decoding module for a group of such devices, the decoding module receiving an electrical signal containing instructions of a non-preselected sequence to switch on and switch off the electrical devices in the group and delivering control signals on the basis of said instructions, and a set of switches controlled by said control signals and each connected between a common electrical power line and a respective electrical device in the group, wherein the controlled switches are mounted in the immediate vicinity of the respective electrical devices of the group, wherein the decoding module is housed in a housing which is separate from the controlled switches, and wherein individual electrical control lines connect said decoding module to each of said controlled switches.

2. A system according to claim 1, wherein the controlled switches are mounted on or in link means for said electrical devices.

3. A system according to claim 2, in which said group of said electrical devices consists of a set of lamps mounted in a light unit comprising a common lamp carrier for said set of lamps, wherein the controlled switches are mounted on the lamp carrier.

4. A system according to claim 3, wherein the controlled switches are removably mounted on the lamp carrier.

5. A system according to claim 1, wherein the controlled switches are semiconductor power switches.

6. A system according to claim 3, wherein each controlled switch is contained in a module, each module cooperating with a lamp support means to define a lamp socket, each said controlled switch dimensioned as a function of the power of the associated lamp.

7. A system according to claim 6, wherein said each module includes a package provided with at least two connectors for powering the associated lamp, and a set of pins for connecting the package to the decoding module and to the power supply line, and wherein each lamp support means is constituted by a single lamp holder including a housing situated in the vicinity of cylindrical passage for receiving the base of the lamp and suitable for receiving said package in the bottom thereof.

8. A system according to claim 6, wherein said each module is associated with a standard socket-forming item fixed to the module and constituting mechanical adapter means between the base of the lamp and a lamp wall.

9. The link means for the system according to claim 2, comprising an adapter for each electrical device suitable for cooperating mechanically with a predefined connector for said each electrical device controlled by the system, said adapter being fixed to a controlled switch module, the link means serving both to mount the electrical devices in the system and to put the controlled switches into circuit.

10. The link means according to claim 9, wherein the adapter is overmolded on the controlled switch module.

11. The link means according to claim 9, wherein mechanical fixing means are provided between the adapter and the controlled switch module.

12. The link means according to claim 9, wherein the adapter and a package for the controlled switch module are integrally formed.

* * * * *

UNITED STATES PATENT AND TRADEMARK OFFICE
CERTIFICATE OF CORRECTION

PATENT NO. : 5,182,494

DATED : January 26, 1993

INVENTOR(S) : Segaud

It is certified that error appears in the above-indentified patent and that said Letters Patent is hereby corrected as shown below:

Column 2, line 63, delete "apporpriate" insert --appropriate--.

Signed and Sealed this

Fifteenth Day of August, 1995

Attest:

BRUCE LEHMAN

Attesting Officer

Commissioner of Patents and Trademarks